(12) United States Patent
Smith

(10) Patent No.: US 8,649,134 B2
(45) Date of Patent: Feb. 11, 2014

(54) ELECTROSTATIC DISCHARGE PROTECTION RAIL CLAMP WITH DISCHARGE INTERRUPTION CIRCUITRY

(75) Inventor: Jeremy C. Smith, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 205 days.

(21) Appl. No.: 12/722,514

(22) Filed: Mar. 11, 2010

(65) Prior Publication Data

US 2011/0222196 A1  Sep. 15, 2011

(51) Int. Cl.
*H02H 9/00* (2006.01)

(52) U.S. Cl.
USPC ........................................................... 361/56

(58) Field of Classification Search
USPC ........................................................... 361/56
See application file for complete search history.

(56) References Cited

U.S. PATENT DOCUMENTS

| | | | |
|---|---|---|---|
| 6,965,503 B2* | 11/2005 | Connor et al. | 361/56 |
| 6,989,979 B1* | 1/2006 | Tong et al. | 361/91.1 |
| 7,027,275 B2 | 4/2006 | Smith | |
| 7,196,890 B2 | 3/2007 | Smith | |
| 2010/0157491 A1* | 6/2010 | Hong | 361/56 |

\* cited by examiner

*Primary Examiner* — Scott Bauer

(74) *Attorney, Agent, or Firm* — Egan, Peterman, Enders LLP.

(57) ABSTRACT

An electrostatic discharge (ESD) protection circuit apparatus is disclosed. The apparatus includes activation circuitry coupled to a first node. The activation circuitry includes a capacitor and a selectable load. A time constant $\tau$ associated with the activation circuitry varies in accordance with the selectable load. The activation circuitry is configured to provide $\tau=\tau_1$ for detection of an ESD event. A shunt is selectively enabled by the activation circuitry to short the first node to a second node in accordance with the detection of the ESD event. The activation circuitry is configured subsequent detection of the ESD event to provide $\tau=\tau_2$, wherein $\tau_2 > \tau_1$.

25 Claims, 6 Drawing Sheets

ELECTROSTATIC DISCHARGE PROTECTION RAIL CLAMP WITH DISCHARGE INTERRUPTION CIRCUITRY

TECHNICAL FIELD

The invention is directed toward electrostatic discharge protection circuitry.

BACKGROUND OF THE INVENTION

The amount of electrostatic charge on an object can be rapidly altered as a result of an electrostatic discharge (ESD) event. An ESD event can alter the electrical characteristics of circuitry including semiconductor components so as to degrade or destroy the components. The voltage potential from accumulated charge may exceed the component's breakdown threshold and lead to damage from excessive voltage or damage from the resulting discharge currents. As electrical devices and components have become smaller, they have become more susceptible to harm from ESD events.

ESD events impact production yields, product quality, and product reliability. ESD events can occur throughout manufacturing, testing, shipping, handling, or use of a product. Component damage can occur due to a discharge or from the accumulation of charge. Ample opportunities for an ESD event arise during the manufacture and use of electronic circuitry including integrated circuits.

ESD mitigation approaches are implemented to improve or ensure production yields, product quality, or product reliability. With respect to integrated circuits, ESD protection circuitry is incorporated into the integrated circuits to protect the core of the integrated circuit from ESD events that might occur during manufacture, testing, and use. Integrated circuit ESD protection typically shunts current on integrated circuit pads or voltage rails through a device more suitable for carrying larger currents than the core of the integrated circuit.

One ESD protection circuit architecture uses a shunt having a trigger with a short time constant. The short time constant enables the ESD protection circuitry to better distinguish between normal transient events such as a power-up and fast events such as ESD, to avoid undue interference with transient operations that are part of the normal operation of the integrated circuit. The smaller time constant can cause the ESD protection circuitry to inadequately dissipate the charge or to take an undesirably long time to dissipate the charge.

Another ESD protection circuit architecture uses a shunt having a trigger with a long time constant. The long time constant can result in a more complete dissipation of the charge or a faster dissipation of the charge. One disadvantage of the long time constant, however, is that the ESD protection circuit may be less capable of consistently and reliably distinguishing an ESD event from other transient events such as a power-up. Another disadvantage of typical long time constant shunt designs is the relatively large semiconductor die area used to implement the long time constant.

SUMMARY

Methods and apparatus for providing ESD protection are described. One method of protecting a circuit from an ESD event includes providing a selectable shunt between a first node and a second node of the circuit. The shunt is enabled by activation circuitry in response to an ESD event on the first node. The shunt activation circuitry is associated with a time constant $\tau=\tau_1$ for detecting the ESD event. The activation circuitry is configured such that $\tau=\tau_2$ subsequent to enabling the shunt, wherein $\tau_2>\tau_1$.

In one embodiment, an electrostatic discharge (ESD) protection circuit apparatus includes activation circuitry coupled to a first node. The activation circuitry includes a capacitor and a selectable load. A time constant $\tau$ associated with the activation circuitry varies in accordance with the selectable load. The activation circuitry is configured to provide $\tau=\tau_1$ for detection of an ESD event. A shunt is selectively enabled by the activation circuitry to short the first node to a second node in accordance with the detection of the ESD event. The activation circuitry is configured subsequent to the detection of the ESD event to provide $\tau=\tau_2$/wherein $\tau_2>\tau_1$.

Other features and advantages of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
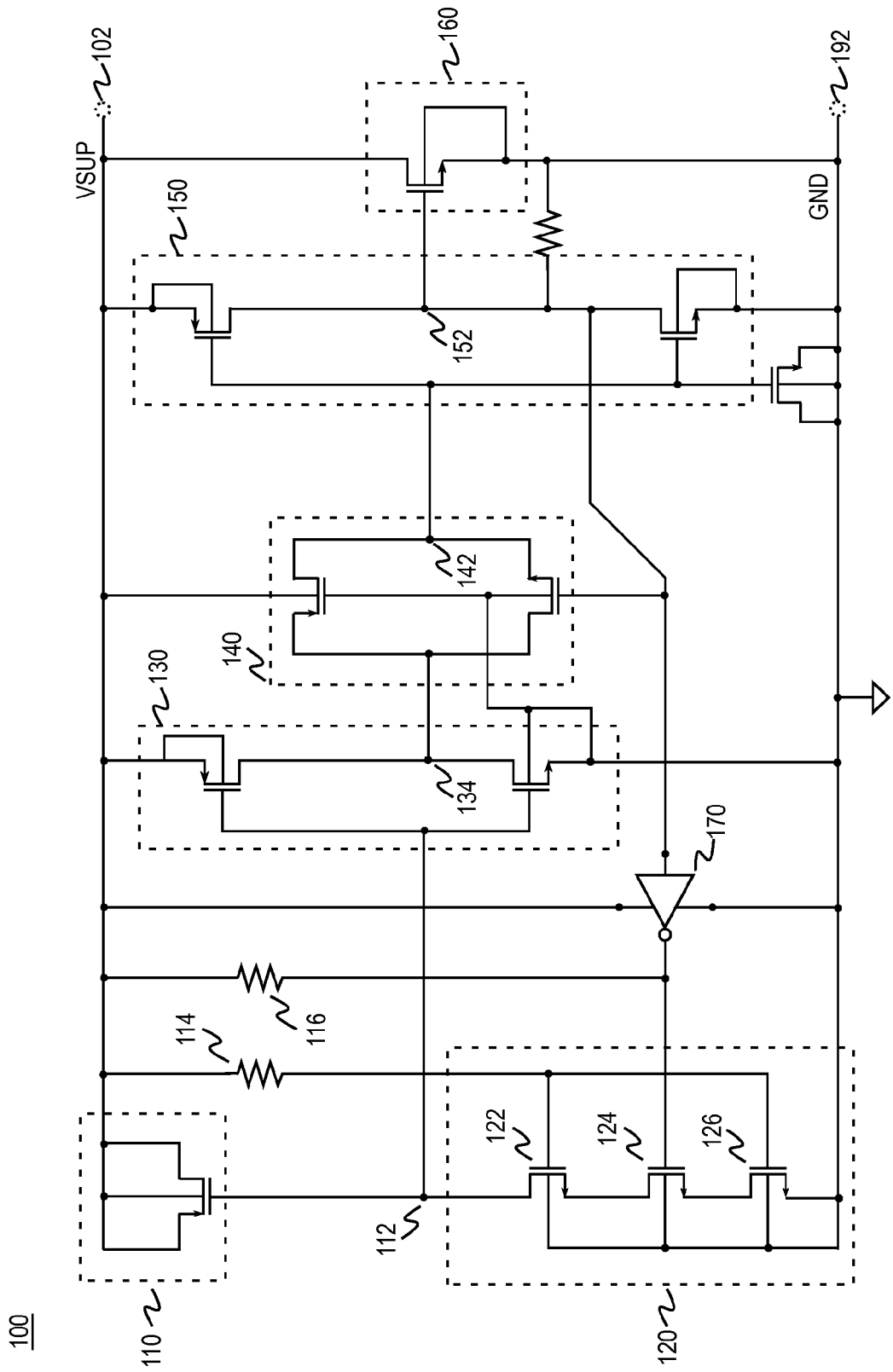
FIG. 1 illustrates one embodiment of ESD protection circuit.

An imbalance of electrical charge on the surface of an object is referred to as an electrostatic charge or static electricity. An electrostatic charge can accumulate onto an object by various means including contact with another charged object, induction, and ion bombardment.

Electrostatic charge can also be accumulated through triboelectric charging. Triboelectric charging occurs due to the transference of electrons from the surface of one object to the other object. Triboelectric charging can occur as a result of contact and subsequent separation of two objects even if the objects are electrically neutral or at the same electrical potential (i.e., relative neutrality).

The accumulation of electrostatic charge from typical manufacturing tasks may result in a change in electrical potential by several thousands or even tens of thousands of volts. The amount of charge can be altered by subsequent electrostatic discharge (ESD). ESD is a transfer of charge between objects at different electrical potentials.

Although the characteristic profile of an ESD event may vary depending upon the manner of charge accumulation and the characteristics of the discharge path, an ESD event is generally a transient event with a fast rise time (up to ten nanoseconds) and a short duration up to one microsecond). In contrast, expected transient events such as a power-up have rise times on the order of milliseconds and last considerably longer than an ESD event.

ESD events are sometimes caused by contact with the human body, by machinery such as manufacturing or test equipment, or in electrically active environments, as may be incurred in many consumer applications. Opportunities for electrostatic discharge can occur at any point during operation or various stages of device life including manufacturing, testing, shipping, and handling of an assembled device or its components. The damage can result as a result of a discharge to or from the device or individual components. Damage can also result from the electrostatic fields accompanying the charge transfers.

An ESD event can alter the electrical characteristics of circuitry including semiconductor components. The voltage potential from accumulated charge may exceed the component's breakdown threshold and lead to damage from excessive voltage or damage from the resulting discharge currents. As electrical devices and components have become smaller, they have become more susceptible to harm from ESD events. Even if an ESD event does not destroy a component, the component may be operationally degraded. Degradation can be more detrimental than destruction because the degradation might not be readily detectable. For example, operational degradation can lead to unexpected behavior from an operating device or render components or circuitry unexpectedly vulnerable to a subsequent ESD event.

A variety of ESD events can occur in electronic components including integrated circuits such as: discharge between the pads of an integrated circuit, discharge between voltage supply terminals, and discharge between pads and voltage supply terminals. Various types of ESD protection circuitry can be used to protect integrated circuitry during manufacture, testing, and operation. In general, ESD protection circuitry is used to protect the input/output circuitry and internal circuitry of an integrated circuit from excessively large and sudden discharges of electrostatic energy.

The objective for ESD protection in general is to provide a shunting path for each potentially damaging ESD path. Integrated circuit ESD damage typically occurs in metal-oxide semiconductor field effect transistor (MOSFET) devices or interconnecting layers coupling MOSFETs together to form a circuit. Each pin in an integrated circuit must be coupled to an appropriate ESD protection circuit such that the ESD discharge current is shunted away from the internal portions of the chip that are the most sensitive to damage. As such, ESD discharge paths must be provided between every pair of pins in an integrated for both positive and negative polarities.

For example, a shunting path is required to the top rail for ESD currents produced by ESD potentials applied to the protected node that are significantly more positive than anywhere else on the integrated circuit. Similarly, a shunting path is desirable for ESD currents that are produced by ESD potentials that are significantly more negative than elsewhere on the integrated.

Just as ESD pulses can be applied between the input/output (I/O) pads and the supply rails, ESD discharges can occur between the power supply rails. For example, for top rail to bottom rail stress, ESD current typically flows through a rail clamp from the top rail to the bottom rail. For bottom rail to top rail stress, ESD current flows from the bottom rail to the top rail.

A rail clamp may be utilized to provide a coupling between the top and bottom rails for those ESD paths that require such a coupling in order to complete the discharge loop. A rail clamp circuit is typically a fundamental component in providing a discharge path for ESD polarities that cause the first current electrode of the rail clamp to be more positive than its second current electrode. For polarities that cause the second current electrode of the rail clamp to be more positive than the first, a power bus diode can be used for the ESD dissipation path. This power bus diode often exists by default in an integrated circuit and is normally reversed-biased during normal operation. In general, one objective of the ESD protective circuitry is to keep the maximum voltage potential in the discharge loop within acceptable limits.

ESD events are usually less than one microsecond in duration. The rise times are usually less than approximately ten nanoseconds. ESD events at the input/output (I/O) pads of an integrated circuit can produce rising potentials on the power supply rails. The rail clamp circuit must be able to detect these fast transients and begin conducting so as to shunt the resulting ESD current. However, the rail clamp must distinguish between an ESD event and other transient events that are part of normal operation. For example, the rail clamp should not trigger during a power-up of the integrated circuit.

Once triggered, the rail clamp circuits should stay in a highly conductive state for the entire duration of the ESD pulse so that all of the ESD energy is safely discharged. If the rail clamp circuit were to shut-off prematurely, the ESD energy may not be fully discharged thus damaging potentials can build up between the power rails resulting in device failure.

The time constant associated with the trigger typically also controls the length of time the shunt is enabled. The choice of a short time constant leads to fast detection of an ESD event and ease of differentiation between an ESD event and a power-up event. The choice of a longer time constant causes the ESD protection circuit to less reliably differentiate between an ESD event and a power-up event. Instead of selecting a single time constant between these extremes for triggering and dissipation, an ESD protection circuit utilizing a first time constant for triggering and a second time constant for dissipation is described.

FIG. 1 illustrates one embodiment of an ESD protection circuit. ESD protection circuit 100 shunts the supply (VSUP) and ground (GND) rails or nodes to each other in the event an ESD event is detected on the VSUP rail.

The primary components of the ESD protection circuit includes shunt activation circuitry and the shunt 160. The shunt activation circuitry includes a capacitor 110 and a selectable load 120. In one embodiment, the capacitor 110 is a transistor adapted to function as a capacitor. Series-coupled transistors 122, 124, and 126 form the selectable load 120. Additional circuitry such as pull-up resistors 114, 116, inverters 130, 150, 170, and transmission gate 140 ensure initial conditions or perform various signal conditioning functions for the primary components. The operation of the ESD protection circuit may be better understood in view of the profiles of the types of events anticipated for the power supply rails.

Figure 2:
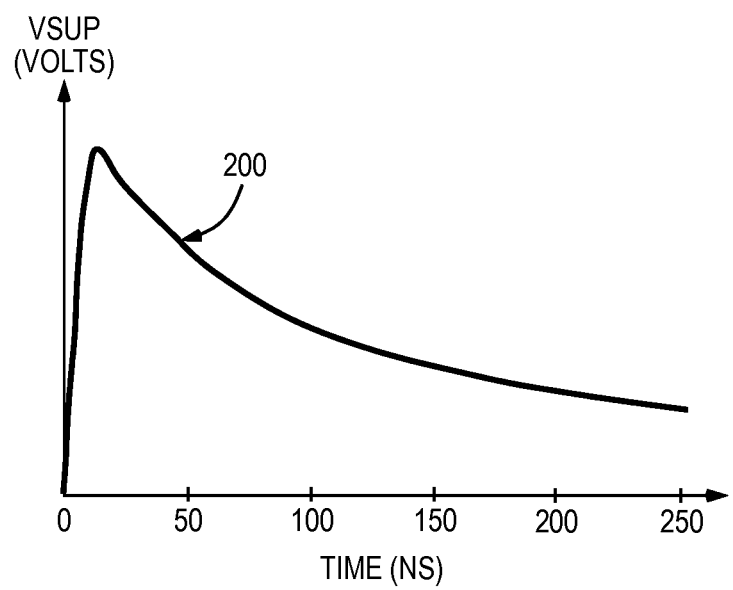
FIG. 2 illustrates one embodiment of an ESD event.

FIG. 2 illustrates one embodiment of an ESD event profile 200 occurring on the VSUP rail and any node of that rail such as might occur from contact with a human body. A significant change in node voltage occurs over nanoseconds. The ESD event is a transient event characterized by an initial high slew rate relative to the slew rate of slew rates expected for power-up events. The ESD protection circuit should be triggered to shunt the ESD current near the inception of the ESD event. The shunt should be enabled throughout the duration of the ESD event.

Figure 3:
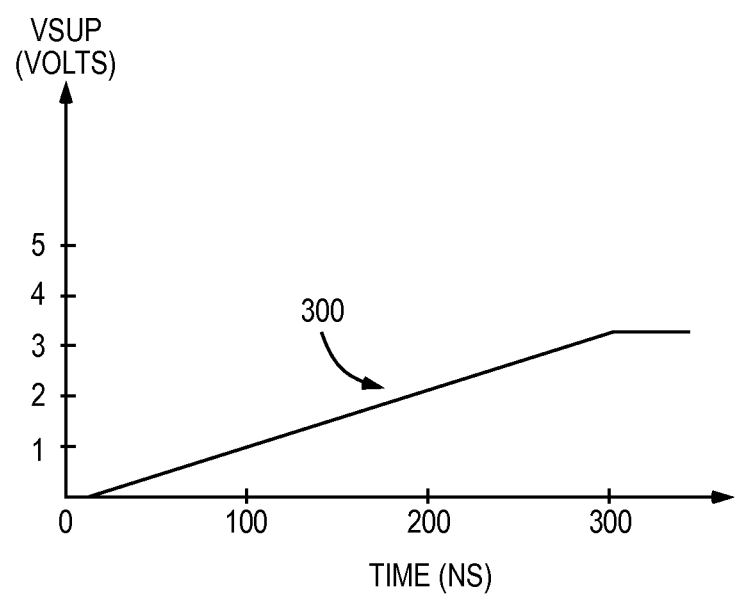
FIG. 3 illustrates one embodiment of a power-up event.

FIG. 3 illustrates one embodiment of a power-up event for the VSUP rail. The power-up event profile 300 exhibits a smaller maximum slew rate than does the ESD event profile of FIG. 2. Indeed, the slew rates vary by at least a few orders of magnitude. In the illustrated embodiment, profile 300 also exhibits a substantially monotonic change in slew rate from the power-off to the power-up states.

Referring back to FIG. 1, the operation of the ESD protection circuit is explained in the context of an ESD event occurring at any first node coupled to the VSUP rail. The resistance provided by selectable load 120 for the current path from node 112 to ground can be selected from at least two values. When transistors 122-126 are "on" as determined by the gate voltage at transistor 124, selectable load 120 provides a first resistance, RS1. When any of transistors 122-126 is "off" as determined by the gate voltage of transistor 124, selectable load 120 provides a second resistance, RS2. In the illustrated embodiment, RS2 can be very large due to the electrical properties of the field effect transistors. In particular RS2>>RS1. The only current flowing through the selectable load is leakage current. The time constant τ associated with the activation circuitry is determined predominately by the capacitance in conjunction with the resistance (RS1 and RS2) of the load 120.

The ESD event causes the capacitor 110 to increase the voltage at node 112. The selectable load is providing a first resistance (RS1) at this time because transistors 122, 124, and 126 are conducting due to pull-up resistors 114, 116 and the voltage supplied by the ESD event itself. As a result the shunt activation circuitry is associated with a first time constant, τ=τ$_1$ for triggering in response to an ESD event.

Inverter 130 inverts the node 112 output to provide an inverted activation circuitry signal to transmission gate 140. In the illustrated embodiment, transmission gate 140 comprises a p-type metal oxide semiconductor (PMOS) transistor and an n-type metal oxide semiconductor (NMOS) transistor. The transmission gate performs signal conditioning.

The PMOS transistor of the transmission gate passes a strong 1 but only a weak 0. The NMOS transistor of the transmission gate passes a strong 0 but only a weak 1. These properties are due to the voltage drops resulting from the transistor threshold voltages.

The inverted activation circuitry signal is passed to inverter 150. The output of inverter 150 enables the shunt 160 that effectively shorts the VSUP and GND rails to each other. Shunt 160 is embodied as a relatively large transistor. The gate of the transistor is coupled to the output of inverter 150. In one embodiment, the shunt is a field effect transistor. Once the shunt is enabled, the shunt diverts the bulk of the ESD event to the GND rail.

The time constant that proved useful for detecting the ESD event will result in rapid depletion of charge from node 112 through the selectable load. This in turn can result in premature termination of the shunting effect of shunt 160. In order to keep the shunt enabled, the dissipation of charge from node 112 through selectable load 120 is interrupted using feedback from the shunt.

The output of inverter 150 is itself inverted by 170 such that the input to the gate of transistor 124 of the selectable load is complementary to the gate voltage of the shunt. Thus the control for the shunt also effectively controls the resistance presented to node 112. The output of inverter 170 will rise to turn off the gate of transistor 124 for the remaining duration of the ESD event. Turning off transistor 124 ensures that only leakage current now passes from node 112 through the selectable load. The selectable load has thus effectively become a very large resistance (RS2) that significantly alters or interrupts the charge dissipation from node 112. The only current flowing is due to nominal leakage through transistors 122-126.

The resistance now presented by the selectable load results in changing the time constant associated with the activation circuitry to a second value, τ=τ$_2$ and τ$_2$>τ$_1$. In various embodiments, $$\frac{\tau_2}{\tau_1} > 100.$$

As a result of the much larger time constant, the node 112 voltage is sustained to keep the shunt operational until the ESD event has been dissipated. The manner of achieving the larger resistance is also preferable to alternatives that require significant die area for fabrication of large resistors. The activation circuitry thus utilizes a first time constant for detecting the ESD event and a second time constant for holding the shunt enabled.

Figure 4:
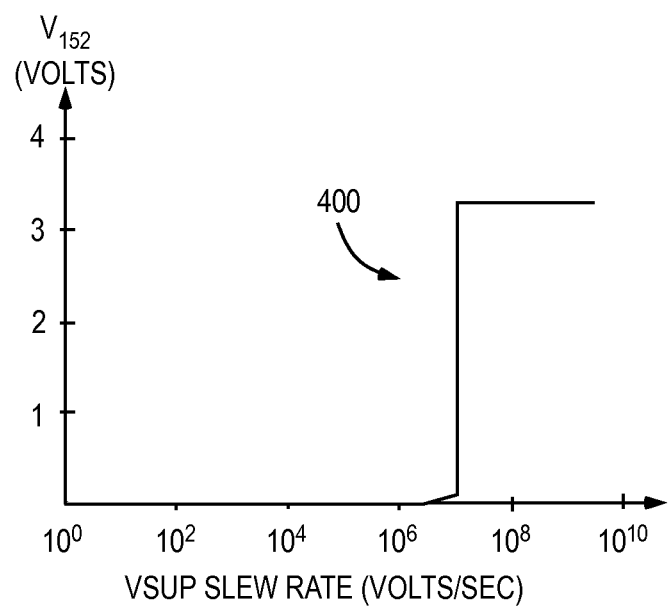
FIG. 4 illustrates one embodiment of a slew rate rejection profile of the ESD protection circuit.

FIG. 4 illustrates one embodiment of a slew rate rejection profile 400 of the ESD protection circuit of FIG. 1. In particular, the voltage at node 152 is shown in response to various VSUP slew rates. The time constants are selected to ensure that shunt triggering occurs outside the slew rates anticipated for power-up events. Due to process, voltage, and temperature variations, prior art ESD protection circuits with a single time constant could have significant variations in triggering threshold and duration of the shunting effect. Allowances would need to be made during the design process to ensure that such a design could distinguish between the ESD event and a power up across a wide range of process, voltage, and temperature variations. In contrast, the present design enables greater resolution in capturing ESD events while rejecting normal operation events such as a power up across a wide range of process, voltage, and temperature variations.

Figure 5:
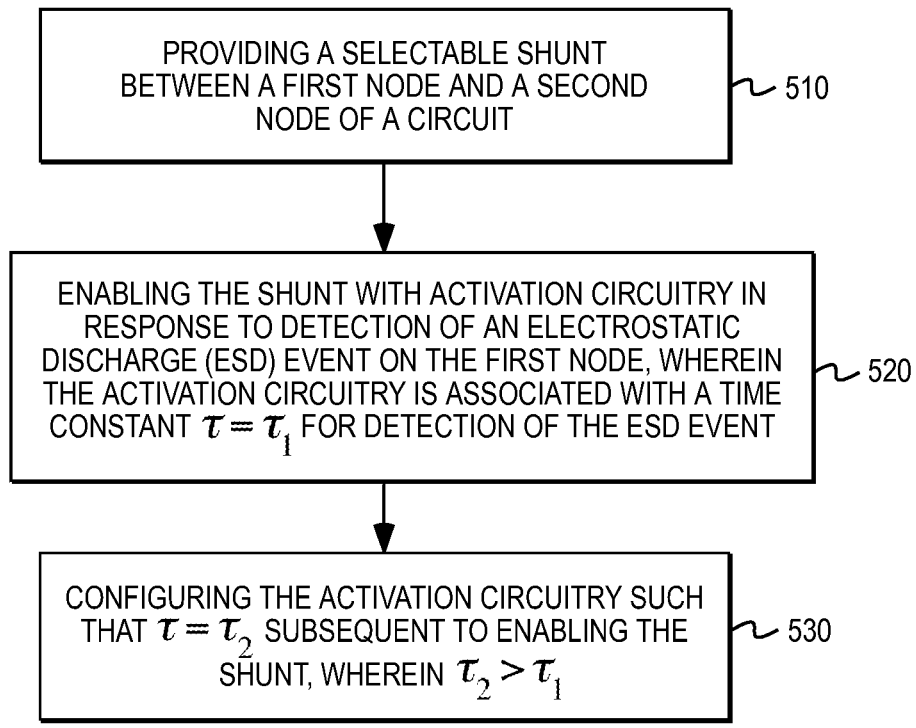
FIG. 5 illustrates one embodiment of a process for handling an ESD event.

FIG. 5 illustrates one embodiment of a process for handling an ESD event. In step 510 a selectable shunt is provided between a first node and a second node of a circuit. In step 520, the shunt is enabled with activation circuitry in response to an electrostatic discharge event on the first node. The shunt activation circuitry has a time constant τ=τ$_1$ for detecting the ESD event. In step 530, the time constant of the activation circuitry is configured to τ=τ$_2$ subsequent to enabling the shunt, wherein τ$_2$>τ$_1$. With respect to FIG. 1, the selectable shunt corresponds to shunt 160. The first and second nodes correspond to the VSUP and GND rails, respectively. The activation circuitry includes capacitor 110 and selectable load 120. The resistance component of the time constant is determined from the resistance of selectable load 120.

The rail clamps can be located within the integrated circuit in a manner such that a plurality of input/output cells share the same ESD protection circuit. The size of an individual rail clamp may be reduced if more than one clamp can be relied upon to provide ESD protection. In an effort to mitigate the effects of parasitic bus resistance, ESD rail clamps may be distributed locally in the input/output cells themselves. In this manner, several ESD rail clamps participate in the ESD event to provide robust protection. In this way, the effects of power and ground rail resistances may also be reduced in comparison with placing fewer, larger clamps in more centralized locations. In general, the sum total of parasitic power and ground rail resistances around the ESD discharge loop and constraints on maximum bond pad voltages establish limits on how far apart ESD rail clamps may be spaced in order to achieve a given level of ESD protection. In general, one skilled in the art is required to balance the tradeoff among ESD protection, resistance, and chip area.

Figure 6:
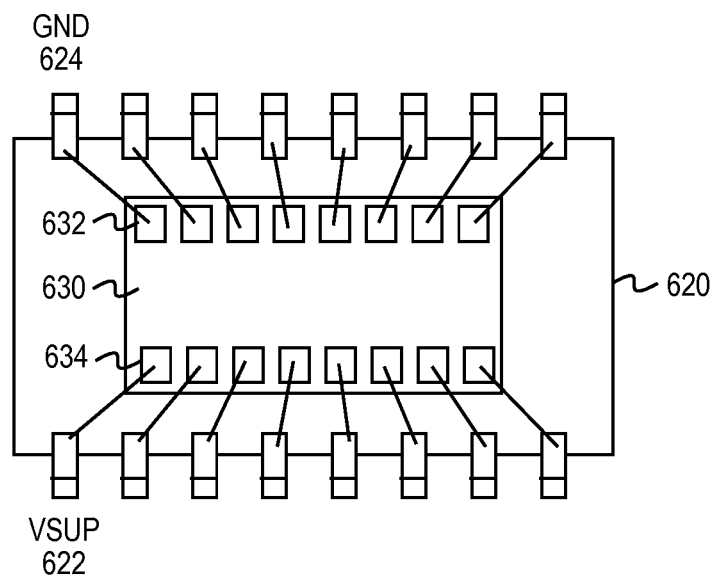
FIG. 6 illustrates one embodiment of an integrated circuit package.

FIG. 6 illustrates a cross-section of one embodiment of an integrated circuit package 610. A semiconductor die 630 is disposed within a carrier 620. Bond pads 632, 634 residing on the semiconductor die are used to electrically connect integrated circuitry fabricated on the die to conductive pins 632, 634. The pins enable communication of electrical signals between the integrated circuit and circuitry external to the integrated circuit package.

In order to protect the core circuitry of the integrated circuit from an ESD event occurring on a supply line, the ESD protection circuit such as illustrated in FIG. 1 is coupled to shunt ESD generated currents between the supply pin (e.g., VSUP 622) and the ground pin (e.g., GND 624) when the ESD event is detected.

In the preceding detailed description, the invention is described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method of protecting a circuit comprising:
    a) providing a selectable shunt between a first node and a second node of a circuit;
    b) enabling the shunt with activation circuitry in response to an electrostatic discharge (ESD) event on the first node, wherein the activation circuitry is associated with a time constant $\tau=\tau_1$ for detecting the ESD event; and
    c) configuring the activation circuitry such that $\tau=\tau_2$ subsequent to enabling the shunt, wherein $\tau_2 > \tau_1$;
    where the activation circuitry comprises at least one first component having a capacitance value and at least one second component having a selectable resistance value; and
    where $\tau_1$ and $\tau_2$ are each determined by a combination of the same first component with the same second component of the activation circuitry.

2. The method of claim 1 wherein
$$\frac{\tau_2}{\tau_1} > 100.$$

3. The method of claim 1 wherein $\tau$ is maintained at substantially $\tau=\tau_2$ until the ESD event is substantially dissipated by the shunt.

4. The method of claim 1 wherein the first and second nodes are supply and ground nodes, respectively.

5. The method of claim 1 wherein the circuit is fabricated on a semiconductor die.

6. The method of claim 1 wherein the shunt is disabled if a slew rate of a voltage of the first node is less than a pre-determined slew rate.

7. The method of claim 6 wherein the pre-determined slew rate is approximately $10^6$ volts/second.

8. The method of claim 1 wherein the shunt is enabled if a slew rate of a voltage of the first node exceeds a pre-determined slew rate.

9. The method of claim 8 wherein the pre-determined slew rate is approximately $10^7$ volts/second.

10. The method of claim 1 where the resistance of the second component is selectable between at least two different values; where $\tau_1$ is determined by a combination of the capacitance value of the first component with a first resistance value of the second component; and where $\tau_2$ is determined by the same capacitance value of the first component with a second and different resistance value of the second component; and where the method further comprises configuring the activation circuitry such that $\tau=\tau_1$ by selecting the first resistance value of the second component, and configuring the activation circuitry such that $\tau=\tau_2$ by selecting the second resistance value of the second component.

11. The method of claim 1 where the first component is coupled between the first node and the second component with a third node defined between the first component and the second component; where the second component comprises at least one transistor coupled between the first component and the second node; where $\tau_1$ is determined by a combination of the capacitance value of the first component with a first resistance value of the second component when the transistor is on to conduct current between the third node and the second node across the transistor; and where $\tau_2$ is determined by a combination of the same capacitance value of the first component with a second and different resistance value of the second component when the transistor is off to alter the flow of current between the third node and the second node to a leakage current across the transistor; and where the method further comprises configuring the activation circuitry such $\tau=\tau_1$ by turning on the transistor, and configuring the activation circuitry such that $\tau=\tau_2$ by turning off the same transistor.

12. The method of claim 11 further comprising providing a feedback voltage from the selectable shunt to control the operation of the transistor such that the transistor is initially on to configure the activation circuitry such that $\tau=\tau_1$ when the shunt is enabled upon occurrence of the ESD event, and such the same transistor is turned off subsequent to enabling the shunt to configure the activation circuitry such that $\tau=\tau_2$ for the remaining duration of the ESD event.

13. An electrostatic discharge (ESD) protection circuit apparatus comprising:
    activation circuitry coupled to a first node, the activation circuitry including a capacitor having a capacitance value coupled to a selectable load having a selectable resistance value, wherein a time constant $\tau$ associated with a shunt trigger varies in accordance with the selectable resistance value of the selectable load; and
    a shunt, wherein the shunt is selectively enabled by the activation circuitry to short the first node to a second node in accordance with detection of an ESD event on the first node, wherein the activation circuitry is configured to provide $\tau=\tau_1$ for detection of the ESD event, wherein the activation circuitry is configured subsequent to detection of the ESD event to provide $\tau=\tau_2$ wherein $\tau_2 > \tau_1$;
    where $\tau_1$ and $\tau_2$ are each determined by a combination of the same capacitor with the same selectable load of the activation circuitry.

14. The apparatus of claim 13 wherein
$$\frac{\tau_2}{\tau_1} > 100.$$

15. The apparatus of claim 13 wherein $\tau$ is maintained at substantially $\tau=\tau_2$ until the ESD event is substantially dissipated by the shunt.

16. The apparatus of claim 13 wherein the first and second nodes are supply and ground nodes, respectively.

17. The apparatus of claim 13 wherein the circuit is fabricated on a semiconductor die.

18. The apparatus of claim 13 wherein the ESD protection circuit is located beneath a pad of an integrated circuit.

19. The apparatus of claim 13 wherein the shunt is disabled if a slew rate of a voltage of the first node is less than a pre-determined slew rate.

20. The apparatus of claim 19 wherein the pre-determined slew rate is approximately $10^6$ volts/second.

21. The apparatus of claim 13 wherein the shunt is enabled if a slew rate of a voltage of the first node exceeds a pre-determined slew rate.

22. The apparatus of claim 21 wherein the pre-determined slew rate is approximately $10^7$ volts/second.

23. The apparatus of claim 13 where the resistance of the selectable load is selectable between at least two different values; where $\tau_1$ is determined by a combination of the capacitance value of the capacitor with a first resistance value of the selectable load; and where $\tau_2$ is determined by the same capacitance value of the capacitor with a second and different resistance value of the selectable load.

24. The apparatus of claim 13 where the capacitor is coupled between the first node and the selectable load with a third node defined between the capacitor and the selectable load; where the selectable load comprises at least one transistor coupled between the capacitor and the second node; where $\tau_1$ is determined by a combination of the capacitance value of the capacitor and a first resistance value of the selectable load when the transistor is on to conduct current between the third node and the second node across the transistor; and where $\tau_2$ is determined by a combination of the same capacitance value of the capacitor and a second and different resistance value of the selectable load when the transistor is off to alter the flow of current between the third node and the second node to a leakage current across the transistor.

25. The apparatus of claim 24 where the transistor of the selectable load is coupled to receive a feedback voltage from the selectable shunt to control the operation of the transistor such that the transistor is initially on to configure the activation circuitry such that $\tau=\tau_1$ when the shunt is enabled upon occurrence of the ESD event, and such that the feedback voltage turns off the transistor subsequent to enabling the shunt to configure the activation circuitry such that $\tau=\tau_2$ for the remaining duration of the ESD event.

* * * * *